United States Patent

Hayes et al.

[11] 3,854,606
[45] Dec. 17, 1974

[54] VEHICLE WITH MATERIAL LOADER

[75] Inventors: Charles T. Hayes, Oakland; Donald M. Faust, Winchester; Harry F. Weinert, Portland, all of Oreg.

[73] Assignee: Cascade Corporation, Portland, Oreg.

[22] Filed: Nov. 26, 1971

[21] Appl. No.: 202,245

[52] U.S. Cl. ............... 214/77 R, 212/46 R, 212/55, 212/59 R
[51] Int. Cl. .............................................. B60p 1/48
[58] Field of Search .......... 214/77 R, 138 R, 138 C, 214/75 R, 75 H, 80; 212/46 R, 46 A, 46 B, 55, 59 R

[56] References Cited
UNITED STATES PATENTS

| | | | |
|---|---|---|---|
| 2,995,261 | 8/1961 | Soyland | 214/138 R |
| 3,027,029 | 3/1962 | Clarke | 214/80 |
| 3,071,265 | 1/1963 | Andre | 214/138 R |
| 3,494,489 | 2/1970 | Kruger | 214/75 H |
| 3,638,804 | 2/1972 | Blakeway | 214/77 R |
| 3,669,286 | 6/1972 | Gauchet | 214/138 R |

Primary Examiner—Robert J. Spar
Assistant Examiner—John Mannix
Attorney, Agent, or Firm—Kolisch, Hartwell, Dickinson & Stuart

[57] ABSTRACT

Vehicle with material loader, the loader including a supporting frame extending transversely of the vehicle's frame adjacent and rearwardly of the vehicle's cab. A foldable boom including main and jib sections is supported by said supporting frame through a spindle journaled on the supporting frame adjacent one end of said frame and the top thereof. An offsetting bracket arm extends from the spindle to mount one end of the main boom section at a location offset to one side of said supporting frame. The boom in its stowed position has its jib section folded under the main boom section, the two sections extending transversely of the vehicle in a region located to said one side of the supporting frame. With raising of the main boom section and unfolding of the boom, the same can swing over the top of said supporting frame to position the boom in any of a number of adjusted positions.

7 Claims, 5 Drawing Figures

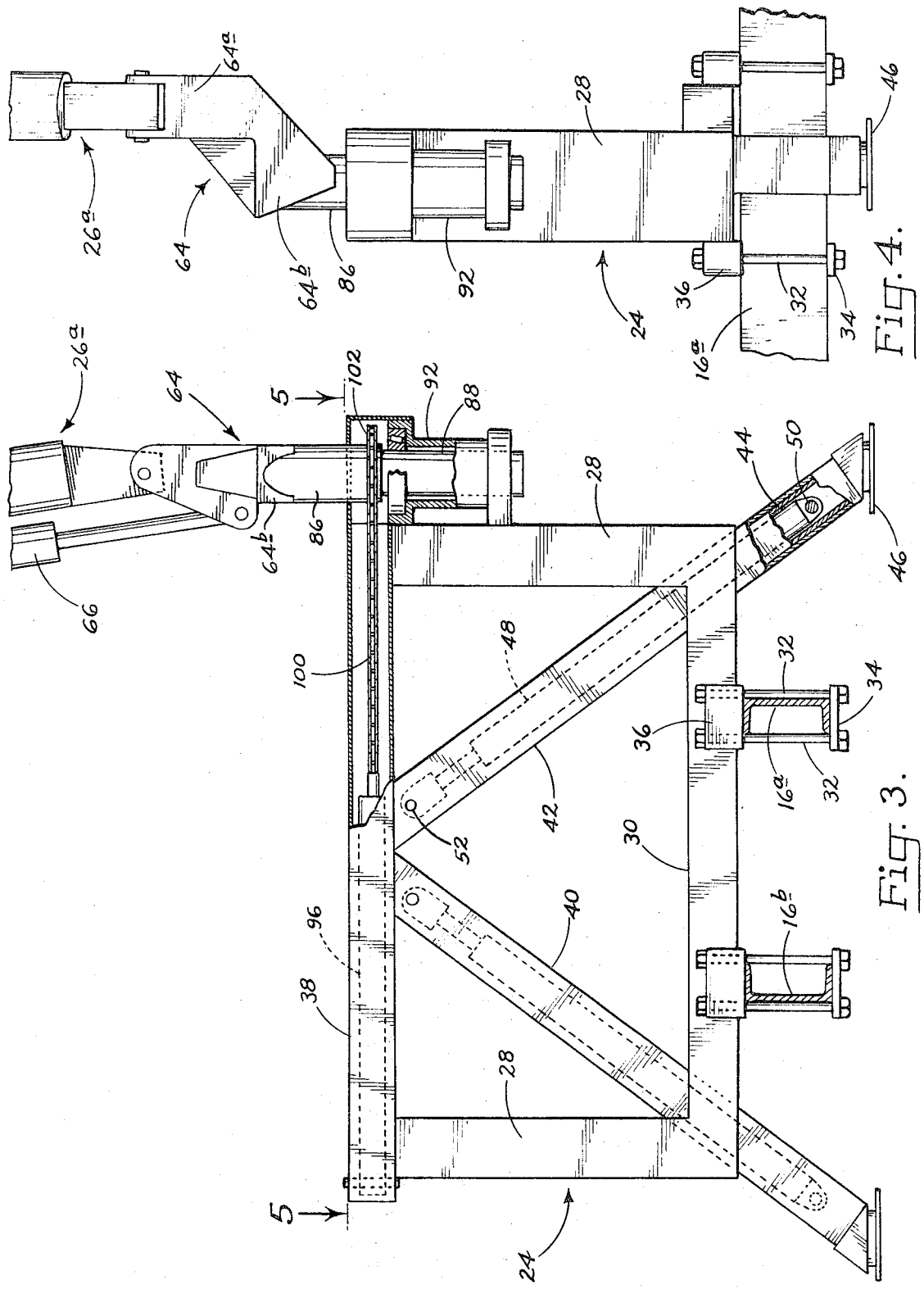

VEHICLE WITH MATERIAL LOADER

This invention relates generally to what are known as material loaders, and more particularly to apparatus of this description of the type adapted to form a permanent installation on a truck or other vehicle, the loader including a foldable boom assembly utilized in loading and unloading material onto and from the vehicle.

Vehicles equipped with a material loader have been demonstrated to be quite useful, since the means for handling the load of the vehicle is carried wherever the vehicle travels. Any disadvantages experienced by having the loader as a permanent installation of the vehicle are more than offset by the convenience of having the instrumentality for loading and unloading always present. Optimumly, the loader should ocupy a minimum amount of space on the vehicle when in its stowed position. At the same time, any boom assembly in the loader should be fully extendable and maneuverable, to permit maximum flexibility in the handling of loads.

A general object of this invention is to provide an improved so-called loader for a vehicle, which meets the above-indicated requirements in a highly practical and satisfactory manner.

Another object is to provide, in combination with a vehicle, a loader therefor which includes a foldable knuckle boom and a supporting frame for the mounting of the base of the boom, the construction being such that the boom, with the apparatus in a stowed position, extends transversely of the vehicle in a region located to one side of said supporting frame.

A more specific object is the provision of a vehicle and loader combination, where the loader includes a foldable boom including main and jib sections, and the boom is afforded swiveling movement with respect to a supporting frame in the organization through a spindle journaled on the supporting frame adjacent the top and one end of the supporting frame.

In a preferred embodiment of the invention, the spindle is supported on mounting structure disposed generally in alignment with the supporting frame, in a direction extending transversely of the vehicle, and an offsetting bracket arm joins the spindle to the base of the main boom section to locate said base on one side of said supporting frame.

Further, in a preferred embodiment of the invention, the foldable boom in its stowed position includes an elongated main boom sebtion extending downwardly and across the vehicle from an elevated swivel connection located on one side of the vehicle, and on top of a supporting frame, and a jib section hinged to the tip end of the main boom section which extends across the vehicle adjacent base of said supporting frame.

The construction contemplated includes fluid-powered means for swiveling the boom when extended about a vertical swivel axis provided by a spindle which mounts the base of the boom. Fluid-powered rams, which together with the main and jib sections in the boom are located to one side of the boom-supporting frame, provide for the powered raising of the main boom section and powered movement of the jib section with resepct to the main section when the boom is used in the handling of material.

Various other objects, features, and advantages will become more fully apparent as the following description is read in conjunction with the accompanying drawings, wherein:

FIG. 3 (second sheet of drawings) is an enlarged view of a supporting frame in the loader, viewing the same from the front, with parts omitted and portions removed, the view further showing base portions of a boom in the loader;

FIG. 4 is a view of an end of the supporting frame, and base portions of the boom, as viewed in FIG. 3.

Figures 1, 2, 5:
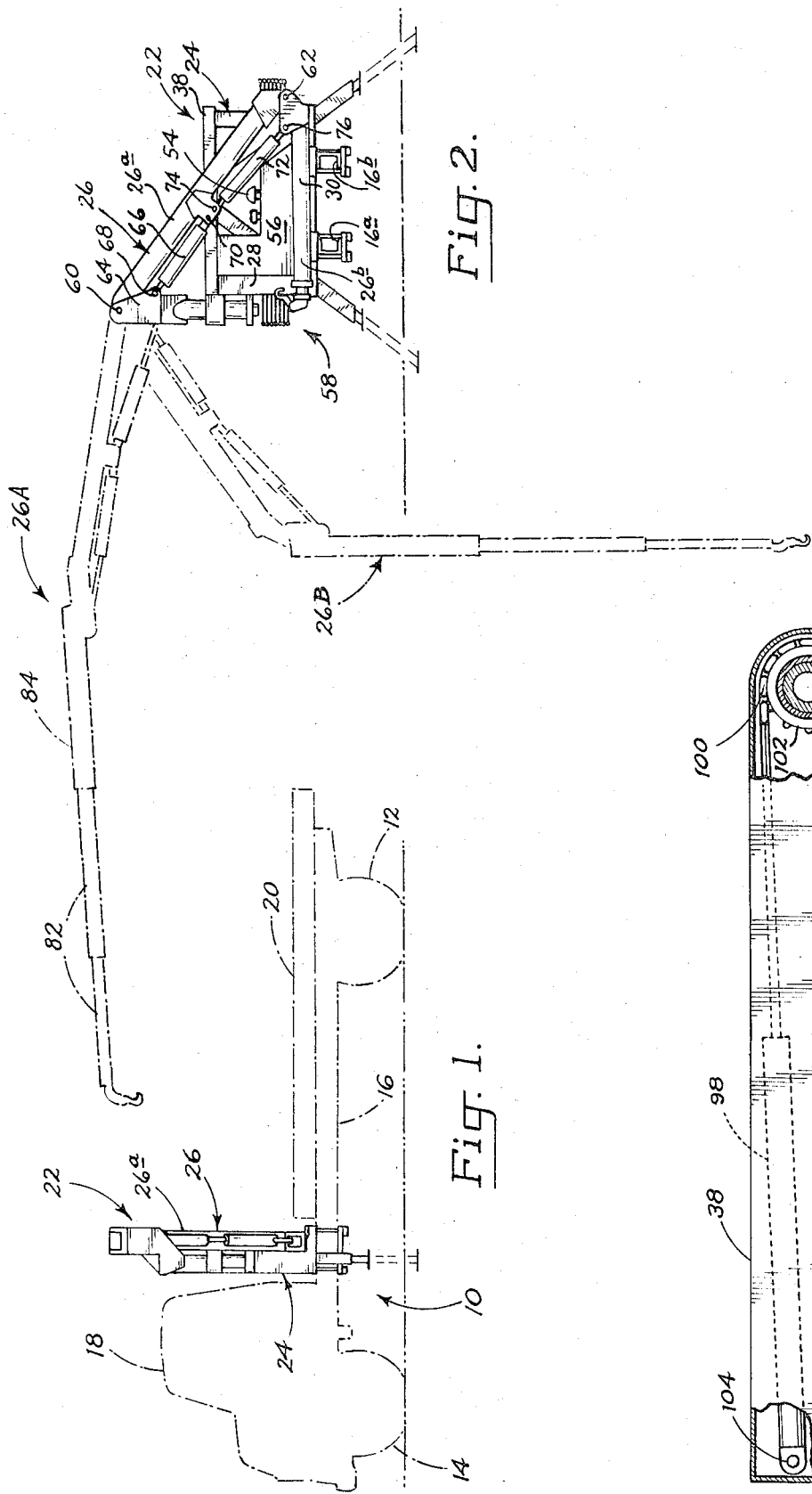
FIG. 1 illustrates, in simplified form, a vehicle, more specifically a truck, equipped with a material loader as contemplated by a preferred embodiment of the invention.
FIG. 2 is a view looking at the material loader from the rear end of the truck in FIG. 1, and showing a boom in the loader in dot-dash outlines in various extended positions.
FIG. 5 (first page of drawings) is a view taken generally along the line 5—5 in FIG. 3.

Referring now to the drawings, and first of all more particularly to FIG. 1, a vehicle, more specifically a truck, is indicated generally at 10, which includes the usual wheels 12 and 14 supporting the truck for movement over the ground, and a vehicle frame 16 extending longitudinally of the truck. Frame 16 is supported by the wheels through the usual spring suspension in the vehicle. An operator's cab is shown at 18, which is located at the vehicle's front end, and a bed 20 provides a supporting surface for the load which is transported by the vehicle.

Referring now also to FIG. 2, a so-called material loader with which the vehicle is equipped is indicated generally at 22. Such includes what is referred to herein as a supporting frame 24 for the loader, which extends transversely of the vehicle's frame, and which is mounted on the vehicle directly behind cab 18, and a foldable knuckle boom indicated generally at 26.

As perhaps most clearly illustrated in FIGS. 3 and 4, supporting frame 24 is of generally rectangular configuration. At the ends of the frame are uprights or posts 28 which are located on opposite sides of the vehicle. Spanning the distance between these posts at the base of the frame is base member 30, which member is utilized in securing the supporting frame to the vehicle frame. The mounting illustrated includes bolts 32 straddling the channel members 16a, 16b, which make up the vehicle frame, which together with straps 34 and lugs 36 joined to member 30 provide a firmly secured mounting for the base member. The top of the supporting frame takes the form of tubular beam 38 spanning the distance between and joined to the upper extremities of uprights 28.

Further serving to make the supporting frame rigid are tubular beams 40, 42 joined to a mid region of beam 38 and inclining downwardly from their region of joinder with this beam to extend through lower end corners of the supporting frame. These tubular beams, it will be noted, together with base member 30, make up a form of A-frame in the construction.

During use of the material loader, it is desirable to brace the supporting frame on the ground whereby the loading of the frame is prevented from being transferred to the suspension system of the vehicle. Toward this end, extensible outriggers are provided which are telescopically received within the tubular beams 40, 42. Specifically, and with reference to FIGS. 3 and 4, such an outrigger may take the form of an extensible tubular sleeve 44 telescopically received within beam 42 provided at the base thereof with an outrigger foot 46. The sleeve is extended from beam 42 through actuation of a fluid-operated ram 48 having its cylinder end anchored to the outrigger sleeve 44 at 50, and its rod end anchored to beam 42 at 52. It will be noted with the construction described, and referring to FIG. 2 that the outriggers may be extended to place the outrigger feet on the ground at points disposed outwardly of the sides of the vehicle, with the supporting frame then being directly braced.

The rams for the outriggers, exemplified by ram 48, as well as other rams to be described used in actuating the loader, receive the fluid under pressure necessary to actuate them from a source of fluid pressure which is located within the confines of rectangular supporting frame 24. Referring to FIG. 2, this source includes a motor, portions of which are shown at 54, driving the usual pump which circulates fluid from a reservoir to the particular ram or rams being actuated. The details of the pump reservoir and associated hosing are not illustrated in FIG. 2, but it should be understood that such components are present and for the most part shielded behind casing structure shown at 56. Also part of the source of fluid under pressure are the usual control valves manipulated by control handles 58 disposed in an array on either end of the supporting frame, thus to be located on either side of the vehicle. With this disposition of the control handles, it is possible for an operator to control boom actuation and actuation of the outriggers from either side of the vehicle.

As perhaps best illustrated in FIGS. 1 and 2, the boom, which includes a main boom section 26a, and a jib boom section 26b, when in a stowed position, and as illustrated in solid lines in these drawings, has its jib section folded under the main boom section. The jib and main boom section are also positioned laterally to one side, i.e., toward the rear side, of the supporting frame just described. The main boom section, and reference is made to FIG. 2, extends diagonally downwardly across the vehicle frame, from a pivot connection 60 for the base of the main boom section located on the left side of the vehicle in FIG. 2. This pivot connection is elevated above the top of the supporting frame. Because of the diagonal disposition of the main boom section, and the illustrated positioning of pivot connection 60 at one side of the vehicle, it is possible to get desired length in the section without exceeding maximum permissible widths allowed the vehicle, and while retaining the advantage of having the boom stowed in a position which extends transversely of the vehicle. The jib section, with the boom folded in its stowed position, extends from a hinge connection 62 with the tip of the main boom section back across the vehicle adjacent the base of the supporting frame, to a tip end which is located on the side of the vehicle having pivot connection 60.

The boom is raised and unfolded by swinging the main boom section upwardly about the horizontal axis provided by pivot connection 60 which connects the base of the boom section with a bracket arm given the reference numeral 64. Such upward swinging movement is powered by actuation of a fluid-powered ram 66, having its rod end hinged to the bracket arm at 68, and its cylinder end hinged to plate structure forming part of the main boom section, at 70. To unfold the jib section, a ram 72 is actuated, having its cylinder end journaled at 74 to the main boom section, and its rod end journaled at 76 to plate strucure forming part of the jib section.

To obtain maximum possible reach in the boom, the jib section may be provided with extensions, such as those indicated in FIG. 2 at 82. These are telescopically received within the sleeve 84 which forms the outer body in the jib section. Extension of the jib extensions is produced under power through actuation of fluid-powered ram means located within the jib, but not specifically illustrated.

Further considering the mounting of the base of boom section 26a, and referring now to FIGS. 3 and 4, the bracket arm 64, described earlier, is an offsetting bracket arm, in that it has an offset upper extremity 64a which is offset to one side of the supporting frame 24. The lower extremity of the bracket arm 64b is positioned above the supporting frame in a region more or less aligned with the frame as it extends transversely of the vehicle.

Portion 64b of the offsetting bracket arm is joined to a sleeve 86 which is suitably secured to and envelops the upper extreity of a spindle 88. The connection may be by welding, preferably at a region above the lead line shown for reference numeral 86 whereby any weakening caused the spindle by the weld is remote from where maximum stresses are imparted to the spindle. The spindle, in turn, is journaled, as by bearings 90, in spindle-mounting structure 92, fastened to an upright 28 in the supporting frame. The mounting structure and the spindle thus are located adjacent one end of the frame and in a position substantially aligned with the frame where such extends transversely of the vehicle. The spindle sleeve and offsetting bracket arm provide for swiveling movement in the boom, whereby the same, with the boom raised, may be swung to all sides of the vehicle, including over the supporting frame and the cab at the forward end of the vehicle.

Positioning of the boom to various adjusted positions about the vertical swivel axis provided by the spindle and related structure is done under power, utilizing fluid rams 96, 98, and reference is now made to FIGS. 3 and 5. Such rams are lodged within tubular beam 38 which forms the top of the supporting frame, thus to be protected by the beam. The rams have rods therein joined to a chain 100 extending in a bend about a sprocket 102 having teeth with which the chain engages. The cylinder ends of the rams are anchored as at 104 to the beam, and the sprocket is joined as by welding to the sleeve 86, thus to be joined through the sleeve to the spindle. It should be obvious that on contraction of a ram to withdraw the rod thereof such is effective to pull the chain toward such ram with turning movement transmitted to the spindle and boom.

The construction described enables powered rotary movement of the spindle to be produced throughout a large arc with means located generally within the confines of the supporting frame described.

The boom in the loader, while capable of occupying the relatively compact state illustrated in FIG. 2, with such folded and disposed toward the rear of the supporting frame, when extended and raised with unfolding of the jib section, provides a highly versatile boom capable of picking up material from all sides of the vehicle as well as from locations disposed below or at elevations above the vehicle. In this latter connection, it should be remembered that in transferring a load, for instance, to a multistoried building, it may be desirable to transport the load to a second or third story elevation. Only two of the multitude of different positions afforded the boom are illustrated in FIG. 2. The boom, as depicted in 26A, is shown with the full reach thereof extending to one side of the vehicle. As depicted in 26B, the boom is shown lowered and extended, as it might be positioned to pick up material from an elevation below the vehicle.

The loader described is relatively easily assembled with the vehicle to become a permanent part thereof. The supporting frame, boom, and means supplying the fluid under pressure for actuating the various rams may form part of a package unit which, through the bolts 32 and straps 34, can be assembled on the frame with minimum difficulty. Included within the unit, of course, are the outriggers which utilize in their mounting the inclined beams which form part of the supporting frame.

While a particular embodiment of the invention has been described, it should be obvious that the invention is subject to variations and modifications. Included within the invention, therefore, are all such variations and modifications as would be apparent to one skilled in the art.

It is claimed and desired to secure by Letters Patent:

1. In combination with a vehicle having a vehicle frame, a material-handling boom and frame construction, comprising
    supporting frame structure having opposed ends and front and rear sides extending between such ends, said frame structure being mounted on the vehicle frame with such occupying an upstanding position and having its front and rear sides extending transversely of the vehicle frame and its ends adjacent opposite sides of the vehicle,
    a foldable boom assembly including main and jib sections located laterally of one of said sides of the supporting frame structure and adapted to be folded and lowered to a stowed position disposed in laterally adjacent relation to said one side, and
    swivel means journaling the base of the main section of the boom assembly on said supporting frame structure adjacent an end of the supporting frame structure and at one side of the vehicle with said base above the top of said supporting frame structure permitting side-to-side swiveling of the boom assembly over the top of the supporting frame structure with the boom assembly unfolded and raised,
    said main boom section with the boom assembly in its stowed position inclining downwardly from said swivel means and across the vehicle to an end disposed on the vehicle's other side adjacent the base of said supporting frame structure.

2. The construction of claim 1, wherein the jib section is pivoted to the main boom section and folds under the main boom section with the boom assembly in its stowed position, the jib section of the boom assembly in the assembly's stowed position extending across the vehicle from the vehicle's said other side to an end disposed adjacent the base of the supporting frame structure at the vehicle's said one side.

3. The construction of claim 1, wherein said swivel means comprises a spindle joined to the base of the main boom section journaled on the supporting frame structure, said spindle occupying a position located between front and rear sides of said supporting frame structure where journaled on the supporting frame structure, and wherein an offsetting bracket arm connects the spindle to the base of the main boom section of the boom assembly supporting the main boom section on said one side of said supporting frame structure.

4. The construction of claim 3, wherein said main boom section is hinged for vertical swinging movement to said offsetting bracket arm in a region of the offsetting bracket arm located to said one side of the supporting frame structure.

5. The construction of claim 3, which in addition comprises fluid ram means for turning said spindle under power which fluid ram means is disposed adjacent the top of said supporting frame structure between the sides thereof.

6. In combination with a vehicle including a vehicle frame and an operator's cab at the forward end of the vehicle,
    an upstanding boom supporting frame having forward and rear sides disposed with said sides extending transversely of the vehicle frame, said supporting frame being disposed adjacent and rearwardly of said cab, said supporting frame including an upstanding post at one end thereof which is adjacent one side of the vehicle,
    a spindle mounting secured to said post and in substantial alignment with said supporting frame in a direction extending transversely of the vehicle,
    an upright spindle journaled in said spindle mounting,
    an offsetting bracket arm joined to said spindle including an offset upper extremity disposed on one side of said supporting frame and above said supporting frame,
    a boom assembly including base and jib sections hinged together to accommodate relative swinging between the sections, said base section of said boom assembly being hinged at its base to said offset upper extremity of said offsetting bracket arm, and
    a fluid-operated ram for raising and lowering the main boom section including one end journaled to said offset upper extremity of said bracket arm and an opposite end journaled on the main boom section at a point remote from the connection with the bracket arm,
    said boom assembly having a folded up stowed position located to one side of said supporting frame, said main boom section in the stowed position of the boom assembly extending across the vehicle to an end adjacent the vehicle's opposite side, and said jib section with the boom assembly in its stowed and folded up position extending across the vehicle from the vehicle's said opposite side to said one side of the vehicle.

7. In combination with a vehicle including a vehicle frame and an operator's cab at the forward end of the vehicle,
    an upstanding boom supporting frame having forward and rear sides disposed with said sides extending transversely of the vehicle frame, said supporting frame being disposed adjacent and rearwardly of said cab, said supporting frame including an upstanding post at one end thereof which is adjacent one side of the vehicle, a spindle mounting secured to said post and in substantial alignment with said supporting frame in a direction extending transversely of the vehicle, an upright spindle journaled in said spindle mounting, an offsetting bracket arm joined to said spindle including an offset upper extremity disposed on one side of said supporting frame and above said supporting frame, and a boom assembly including base and jib sections hinged together to accommodate relative swinging between the sections, said base section of said boom assembly being hinged at its base to said offset upper extremity of said offsetting bracket arm, said boom assmbly having a folded up stowed position located on said one side of said supporting frame and in its said stowed position extending across the vehicle with said main and jib sections located laterally of said one side of said supporting frame.

* * * * *